(12) United States Patent
Pope et al.

(10) Patent No.: US 12,476,732 B2
(45) Date of Patent: Nov. 18, 2025

(54) NETWORK INTERFACE DEVICE WITH FRAME SEQUENCE VALUE CHECKING

(71) Applicant: XILINX, INC., San Jose, CA (US)

(72) Inventors: Steven Leslie Pope, Cambridge (GB); Derek Edward Roberts, Cambridge (GB); David James Riddoch, Cambridgeshire (GB); Ripduman Singh Sohan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 39 days.

(21) Appl. No.: 18/086,528

(22) Filed: Dec. 21, 2022

(65) Prior Publication Data
US 2024/0214111 A1    Jun. 27, 2024

(51) Int. Cl.
*H04L 1/00* (2006.01)

(52) U.S. Cl.
CPC ............ *H04L 1/004* (2013.01); *H04L 1/0083* (2013.01)

(58) Field of Classification Search
CPC ...................................................... H04L 1/004
See application file for complete search history.

(56) References Cited

U.S. PATENT DOCUMENTS

| | | | | |
|---|---|---|---|---|
| 4,638,477 A | * | 1/1987 | Okada | H04L 12/56 370/452 |
| 5,870,406 A | * | 2/1999 | Ramesh | H04L 1/1803 714/709 |
| 6,442,161 B1 | * | 8/2002 | Drummond-Murray | H04L 1/004 370/252 |
| 6,681,364 B1 | * | 1/2004 | Calvignac | H04L 1/0072 714/776 |
| 2003/0235201 A1 | * | 12/2003 | Kasper, II | H04Q 3/0062 375/222 |
| 2005/0129047 A1 | * | 6/2005 | Ku | H04L 49/20 370/428 |
| 2006/0251028 A1 | * | 11/2006 | Nagata | H04W 28/18 370/338 |
| 2012/0170596 A1 | * | 7/2012 | Hwang | H04L 65/1101 370/471 |
| 2015/0263945 A1 | * | 9/2015 | Blessing | H04L 49/252 370/392 |
| 2018/0062987 A1 | * | 3/2018 | Badillo | H04L 12/66 |

* cited by examiner

*Primary Examiner* — Joseph D Torres
(74) *Attorney, Agent, or Firm* — Patterson + Sheridan, LLP

(57) ABSTRACT

A network interface device comprises circuitry to add a frame check sequence value a data packet to be transmitted onto a network. The data packet with the frame check sequence value is stored in memory. Media access control layer circuitry reads the data packet from the memory and determines if the frame check sequence value is correct. When it is note correct, it is determined that the data in the data packet is corrupted.

14 Claims, 6 Drawing Sheets

---

Receiving a data packet to be transmitted onto a network  500

Adding a frame check sequence value to the data packet  502

Storing in a memory the data packet with the frame check sequence value  504

Reading the data packet with the frame check sequence value from the memory  506

Determining if the frame check sequence value is correct for data in the data packet read from the memory  508

When the frame check sequence value is not correct for the data in the data packet read from the memory, determining that the data in the data packet is unexpected  510

NETWORK INTERFACE DEVICE WITH FRAME SEQUENCE VALUE CHECKING

TECHNICAL FIELD

This application relates to a network interface device.

BACKGROUND

Network interface devices (e.g., a network interface card/controller (NIC) or SmartNIC) are known and are typically used to provide an interface between a computing device and a network. Some network interface devices can be configured to process data which is received from the network and/or process data which is to be put on the network.

SUMMARY

According to one aspect, there is provided a network interface device comprising: first circuitry configured to receive a data packet to be transmitted onto a network and to add a frame check sequence value to the data packet; a memory configured to store the data packet with the frame check sequence value; and media access control layer circuitry configured to: read the data packet with the frame check sequence value from the memory; determine if the frame check sequence value is correct for data in the data packet read from the memory; and when the frame check sequence value is not correct for the data in the data packet read from the memory, determine that the data in the data packet is unexpected.

The media access control layer circuitry may be configured to provide in the data packet an indication that the data in the data packet is unexpected, when the media access control layer circuitry determines that the data in the data packet is unexpected.

The indication may be provided by modifying one or more bits of the frame check sequence value.

The indication may be provided by a predefined value in the data packet.

The indication may be provided by a predefined value replacing the frame check sequence value.

The network interface device may comprise physical layer circuitry, wherein the media access control layer circuitry may be configured to cause the data packet, with the indication that the data in the data packet is unexpected, to be provided to the physical layer circuitry for transmitting onto the network.

The media access control layer circuitry may be configured to drop the data packet when the media access control layer circuitry determines that the data in the data packet is unexpected.

The network interface device may comprise physical layer circuitry, wherein when the data in the data packet is unexpected, the media access control layer circuitry may be configured to cause the data packet with the frame check sequence value to be provided to the physical layer circuitry for transmitting onto the network.

The media access control layer circuitry may be configured to cause a retransmit procedure for the data packet when the media access control layer circuitry determines that the data in the data packet is unexpected.

The network interface device may be configured to operate in accordance with a transmission control protocol and/or a remote direct memory access protocol.

According to another aspect, there is provided a method comprising: receiving a data packet to be transmitted onto a network; adding a frame check sequence value to the data packet; storing in a memory the data packet with the frame check sequence value; reading the data packet with the frame check sequence value from the memory; determining if the frame check sequence value is correct for data in the data packet read from the memory; and when the frame check sequence value is not correct for the data in the data packet read from the memory, determining that the data in the data packet is unexpected.

The method may be performed in a network interface device.

The determining if the frame check sequence value is correct for data in the data packet read from the memory may be performed prior to any transmission of the data packet onto the network.

The determining if the frame check sequence value is correct for data in the data packet read from the memory may be carried out at a medium access control layer.

The determining that the data in the data packet is unexpected may be carried out at a medium access control layer.

The method may comprise providing, in the data packet, an indication that the data in the data packet is unexpected, when the data in the data packet is determined to be unexpected.

The indication may be provided by modifying one or more bits of the frame check sequence value.

The indication may be provided by a predefined value in the data packet.

The indication may be provided by a predefined value replacing the frame check sequence value.

The method may comprise causing the data packet, with the indication that the data in the data packet is unexpected, to be transmitted onto the network.

The method may comprise dropping the data packet when the data in the data packet is determined to be unexpected.

The method may comprise causing the data packet with the frame check sequence value to be transmitted onto the network.

The method may comprise causing a retransmit procedure for the data packet when the data in the data packet is determined to be unexpected.

According to another aspect, there is provided a network interface device comprising: media access control circuitry configured to: receive a receive data packet with a frame check sequence value from a network; determine if the frame check sequence value is correct for data in the receive data packet; and when the frame check sequence value is correct for the data in the receive data packet, store the receive data packet in a memory; the memory configured to store the receive data packet with the frame check sequence value; and frame check sequence value circuitry configured to: read the receive data packet with the frame check sequence value stored in the memory; determine if the frame check sequence value is correct for data in the receive data packet stored the memory; and when the frame check sequence value is not correct for the data in the receive data packet stored in the memory, determining that the data in the receive data packet is unexpected.

The frame check sequence value circuitry may be configured to discard the received data packet when the frame check sequence value circuitry determines that the data in the data packet is unexpected.

The frame check sequence value circuitry may be configured, for another receive data packet for which it is determined that the frame check sequence value is correct, remove the frame check sequence value from the another receive data packet.

The network interface device may be configured to operate in accordance with a transmission control protocol and/or a remote direct memory access protocol.

According to another aspect, there is provided a method comprising: receiving a receive data packet with a frame check sequence value from a network; determining if the frame check sequence value is correct for data in the receive data packet; when the frame check sequence value is correct for the data in the receive data packet, storing the receive data packet in a memory with the frame check sequence value; reading the receive data packet with the frame check sequence value stored in the memory; determining if the frame check sequence value is correct for data in the receive data packet stored the memory; and when the frame check sequence value is not correct for the data in the receive data packet stored in the memory, determining the data in the receive data packet is unexpected.

The method may be performed in a network interface device.

The determining if the frame check sequence value is correct for data in the receive data packet and when the frame check sequence value is correct for the data in the receive data packet, the storing of the receive data packet in the memory with the frame check sequence value may be carried out at a medium access control layer.

The method may comprise be configured to discard the received data packet when the data in the data packet is determined to be unexpected.

The method may comprise, for another receive data packet read from the memory and for which it is determined that the frame check sequence value is correct, removing the frame check sequence value from the another receive data packet.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF DRAWINGS

Some embodiments are illustrated by way of example only in the accompanying drawings. The drawings, however, should not be construed to be limiting of the arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

When data is to be transferred between two data processing systems over a data channel, each of the data processing systems has a suitable network interface to allow it to communicate across the channel. The data channel may be provided by a network. For example, the network may be based on Ethernet technology or any other suitable technology. The data processing systems may be provided with network interfaces that are capable of supporting the physical and logical requirements of the network protocol. The physical hardware component of network interfaces are referred to as network interface devices or network interface cards/controllers (NICs). In this document, the network interface device is referred to a NIC. It should be appreciated that the NIC may be provided in any suitable hardware form such as integrated circuit or hardware module. A NIC is not necessarily implemented in card form.

Computer systems may have an operating system (OS) through which user level applications communicate with the network. A portion of the operating system, known as the kernel, may include protocol stacks for translating commands and data between the applications and a device driver specific to the network interface device, and the device drivers for directly controlling the network interface device. By providing these functions in the operating system kernel, the complexities of and differences among network interface devices can be hidden from the user level applications. In addition, the network hardware and other system resources (such as memory) can be safely shared by many applications and the system can be secured against faulty or malicious applications.

Figure 1:
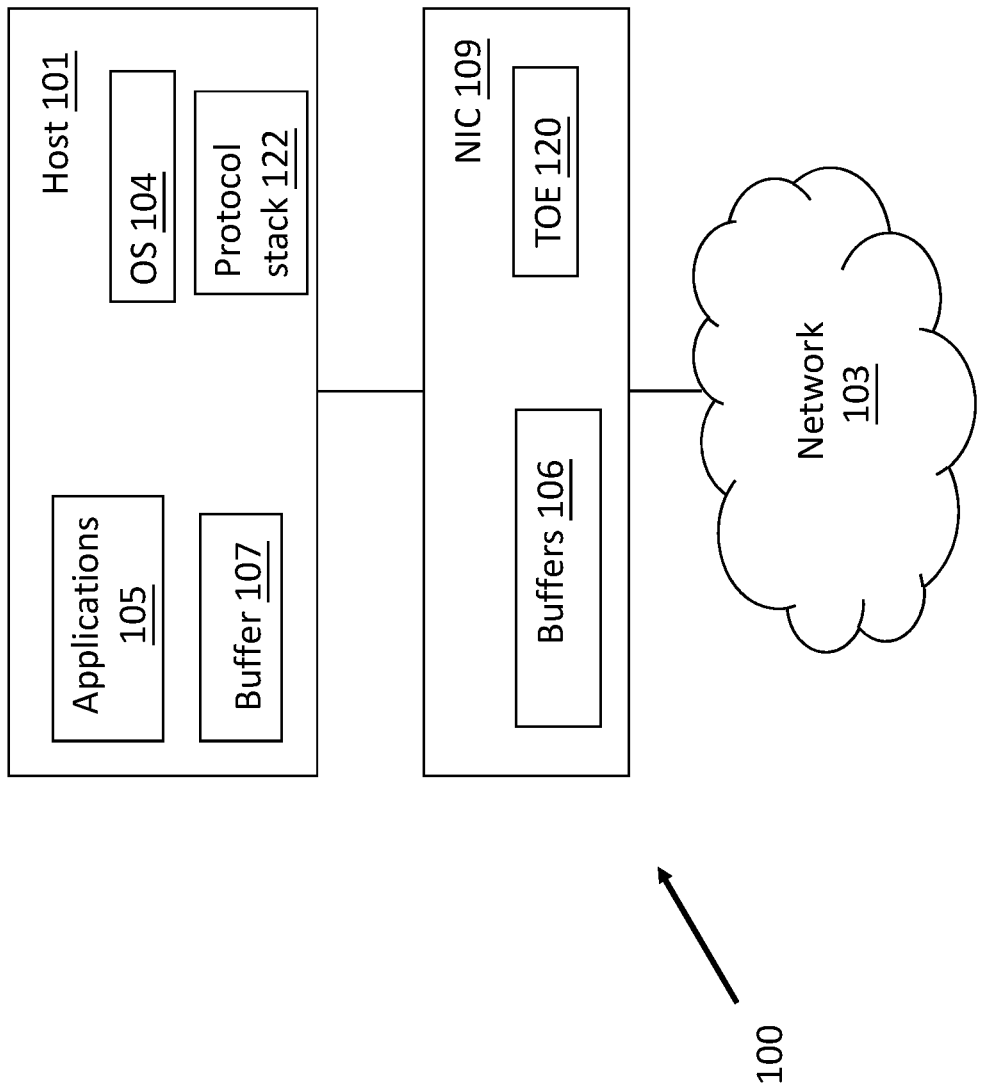
FIG. 1 shows a schematic view of a first data processing system where a host computing device is coupled to a network via a network interface device.

A first example data processing system 100 for carrying out transmission across a network is shown in FIG. 1. The data processing system 100 comprises a host computing device 101 coupled to a NIC 109 (which is one example of a network interface device) that is arranged to interface the host computing device 101 to network 103. The host computing device 101 includes an operating system (OS) 104 supporting one or more user level applications 105. The host computing device 101 may also include a network protocol stack 122. The network protocol stack may be a transport layer protocol stack such as a Transmission Control Protocol (TCP) stack. In some embodiments, the network protocol stack 122 may at least partially be provided by the operating system. Some embodiments may be suitable for use in networks that operate TCP/IP over Ethernet.

The application 105 may send and receive TCP/IP (Internet Protocol) messages by opening a socket and reading and writing data to and from the socket, and the operating system 104 causes the messages to be transported across the network.

Some systems may offload at least partially the protocol stack 122 to the NIC 109. For example, in the case that the stack 122 is a TCP stack, the NIC 109 may comprise a TCP Offload Engine (TOE) 120 for performing the TCP protocol processing. By performing the protocol processing at least partially in the NIC 109 instead of in the host computing device 101, the demand on the processor(s) of the host computing device 101 may be reduced. Data to be transmitted over the network, may be sent by an application 105 via a TOE-enabled virtual interface driver, bypassing the kernel TCP/IP stack entirely. Data sent along this fast path therefore need only be formatted to meet the requirements of the TOE driver in the host 101.

The host computing device 101 may comprise one or more processors and one or more memories. In some embodiments, the host computing device 101 and the NIC 109 may communicate via a bus, for example a peripheral component interconnect express (PCIe bus) or any other suitable bus.

During operation of the data processing system, data to be transmitted onto the network may be transferred from the host computing device 101 to the NIC 109 for transmission. In one example, data packets may be transferred from the host to the NIC 109 (e.g., a network interface device) directly by a host processor. The host computing device 101 may provide data to one or more buffers 106 located on the NIC 109. The NIC 109 may then prepare the data packets and transmit them over the network 103.

Alternatively, the data may be written to a buffer 107 in the host computing device 101. The data may then be retrieved from the buffer 107 by the NIC 109 and transmitted over the network 103. Some systems may support both of these data transfer mechanisms.

In both of these cases, data may be temporarily stored in one or more buffers or other suitable memory prior to transmission over the network.

The data processing system may also receive data from the network via the NIC 109. The data may be temporarily stored in one or more buffers or other suitable memory prior to receive processing by the NIC and/or the host.

Some embodiments may support remote direct memory access (RDMA). RDMA is a hardware mechanism through which the NIC of one node can directly transfer data to or from the main memory of a remote node without involving the remote processor (e.g. operating system OS of either node). The data may be transferred between two applications and their virtual address spaces. The two applications may be on separate nodes.

Figure 2:
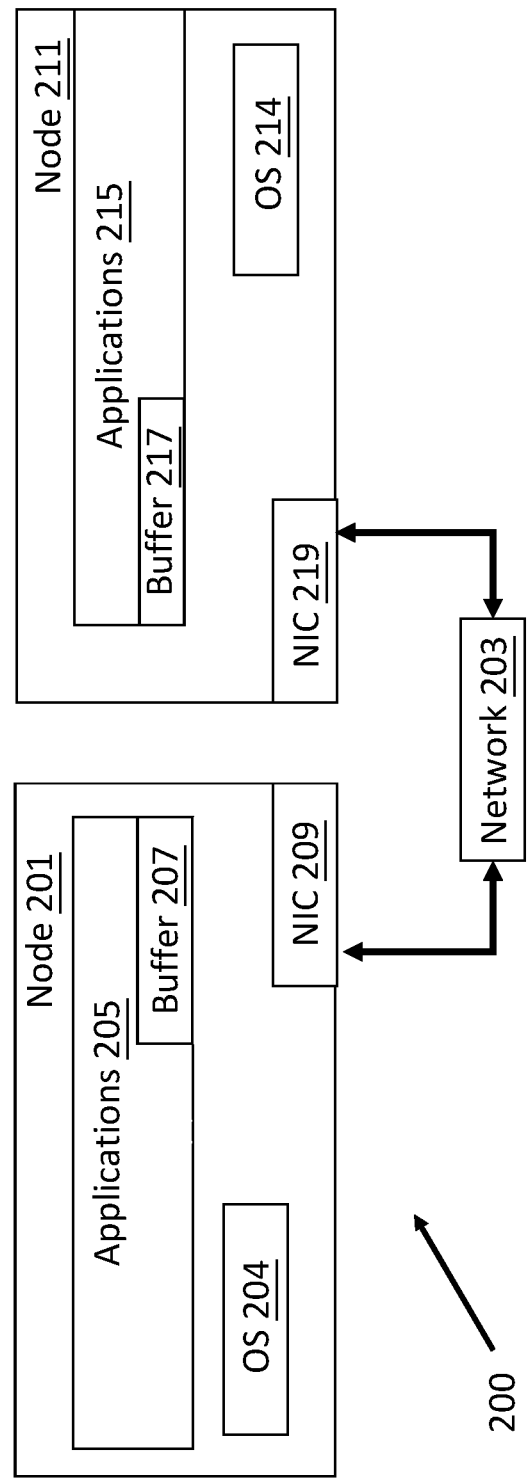
FIG. 2 shows a schematic view of a second data processing system where a host computing device is coupled to a network via a network interface device.

A second example data processing system 100 for carrying out transmission across a network is shown in FIG. 2, and uses RDMA. The data processing system 200 comprises a first node 201, such as a host computing device, coupled to a NIC 209 that is arranged to interface the first node 201 to network 203. The first node 201 includes an operating system OS 204. The first node has one or more user level applications 205. The or each user level application may have a virtual address space or buffer 207. The virtual address space may be part of the host memory of the first node.

In some embodiments, the first node 201 and the NIC 209 may communicate via a bus, for example a peripheral component interconnect express (PCIe bus) or any other suitable bus.

During operation of the data processing system, data to be transmitted onto the network may be transferred from the first node 201 to the NIC 209 for transmission to a second node 211 or received from the second node 211.

The data processing system 200 comprises the second node 211, such as a host computing device, coupled to a NIC 219 that is arranged to interface the second node 211 to network 203. The second node 211 includes an operating system 214. The second node has one or more user level applications 215. The or each user level application may have a virtual address space or buffer 217. The virtual address space may be part of the host memory of the second node.

In this embodiment, the network stack is an RDMA stack. That stack may be at least partially offloaded to the NIC.

The nodes may be any kind of computing device, for example a server, personal computer, or handheld device.

The data which is received from the network and/or which is to be transmitted by the network may be stored in one or more memories or buffers such as previously discussed.

Computer nodes are provided with an operating system (OS). When using an RDMA capable NIC, the OS is not involved in the transfer of data between the nodes.

The data processing system, such as shown in FIG. 1 or FIG. 2, may be any kind of computing device, such as a server, personal computer, or handheld device. In other embodiments one or more different protocols may be used.

Embodiments may be used with any suitable networks, wired or wireless.

The NICs of FIG. 1 or 2 may be at least partially provided by one or more integrated circuits. Alternatively, the NIC may be part of a larger integrated circuit. The NIC may be provided by a single hardware module or by two or more hardware modules. The NIC may provide a network attached CPU (central processing unit) in front of the main CPU. The NIC will be located on a data path between the host CPU (on the host computing device) and the network.

The NIC may be configurable to provide application specific pipelines to optimise data movement and processing. The NIC may integrate high-level programming abstractions for network and compute acceleration.

In the example of FIG. 1 or FIG. 2, the various, different subsystems or regions of the NIC may be implemented on a single die provided within a single integrated package. In other examples, the different subsystems may be implemented on a plurality of interconnected dies provided as a single, integrated package. In some embodiments, the NICs of FIG. 1 or FIG. 2 may be provided by two or more packages, one or more integrated circuits, or one or more chiplets.

The NIC provides an interface between a host computing device and a network. The NIC allows data to be received from the network. That data may be provided to the host computing device. In some embodiments, the NIC may process the data before the data is provided to the host computing device. In some embodiments, the NIC allows data to be transmitted by the network. That data may be provided from the host computing device and/or from the NIC. In some embodiments, the NIC may process the data before the data is transmitted by the network.

The data which is received from the network and/or which is to be transmitted by the network may be stored in one or more memories or buffers such as previously discussed. Error may be introduced into the data as a result of memory corruption such as that resulting from radiation. An error may result due to the corruption of memory while the data is stored.

Figure 3:
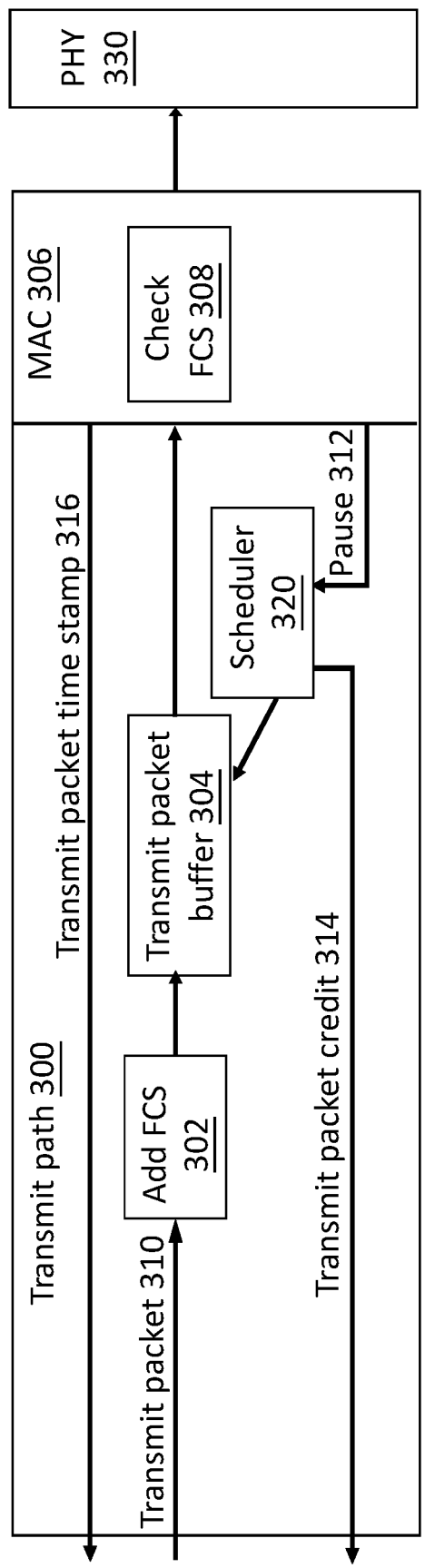
FIG. 3 shows a transmit path of a network interface device of some embodiments.

Reference is made to FIG. 3 which schematically shows a transmit path 300, MAC (medium access control) layer 306 and PHY (physical) layer 330 provided on the NIC. This is for providing data onto the network.

The transmit path is one or more of: logic, one or more FIFOs and/or other memory: and/or one or more CPUs. The components of the transmit path may be chained together and act to move the data to the MAC layer 306. Various of the components of the transmit path may be provided by suitable circuitry. The MAC layer 306 and the PHY layer 330 may be provided by suitable circuitry.

The transmit path 300 receives a stream 310 of transmit packets of data to be output onto the network. The transmit packets of data may have been processed in accordance with the respective transport layer protocol being used, for example TCP or RDMA. The transport layer processing may performed by a transport protocol engine on the host and/or on the NIC.

An FCS (frame check sequence) function 302 generates an FCS for a transmit packet and adds the FCS to the transmit packet. In one embodiment, the FCS is determined based on values in the packet and is added to an FCS field in the packet. In some embodiments, the FCS in introduced along with the packet as soon as it is deemed reliability is required. For example, this may be when the packet enters the data path. In one example, the FCS is carried all the way through the transmit path to transmission. Thus, the FCS may be added on entry to the data path. The FCS function may be provided by suitable circuitry.

FCS refers to extra bits and/or characters added to data packets for error detection and control. These extra bits and/or characters are added to the end of the frame.

The packets to which the FCS have been added are stored in a transmit packet buffer 304 or any other suitable memory. The packets are buffered in the buffers 304 prior to transmission.

A scheduler 320 is configured to control the output of packets from the transmit packet buffer to the MAC layer 306.

The MAC layer 306 can, for example, send a pause request 312 to the scheduler to pause the output of data from the transmit packet buffer. This pause request may, for example, be sent if the MAC layer 306 needs to slow down the rate at which packets are provided to the MAC layer 306. The pause request may cause a pause of a defined length of time. The defined length of time may be predefined and/or may be provided in the pause request itself. Alternatively, the pause request may start a pause and the pause is ended by a start request received from the MAC layer 306.

The scheduler will schedule the movement of the packets from the transmit packet buffer to the MAC layer 306 responsive to the pause signal and/or other signals received from the MAC layer 306.

Some embodiments may use a credit based mechanism. In such a mechanism, credits may provide a flow control mechanism where a data producer advertises an amount of data and a consumer advertises an amount of space available. In this case, the consumer is the transmit path. The scheduler will cause a transmit packet credit 314 to be issued when one or more transmit packet has been sent. This will indicate to an upstream scheduler (not shown) that the transmit packet buffer 304 is able to receive transmit packets. A credit may be issued each time a packet of data is transmitted or each time a given number of packets is transmitted.

The transmit packet buffer 304 outputs packets to the MAC layer 306. The MAC layer 306 is provided with an FCS checking function 308 to check the FCS in each packet. In particular, the FCS checking function 308 will determine the FCS from the values in the packet (excluding the added FCS). The FCS checking function 308 will determine if the determined FCS value is the same as the FCS value in the packet. The FCS checking function may be provided by suitable circuitry.

If the values are the same, then no action in this regard is required by the MAC layer 306.

In some embodiments, the FCS value will remain unchanged in the packet and will be in the packet transmitted across the network. The FCS will in those circumstances be used to determine if the packet has been corrupted when crossing the network.

If the FCS values are not same, the MAC layer 306 makes a determination that the data is unexpected. In other words, there has been a change in the data since the FCS was determined. The data may be considered invalid or incorrect. The data may be unexpected as a result of memory corruption and/or corruption in the logic.

When it is determined that the data is unexpected, the MAC layer 306 may drop the packet.

When it is determined that the data is unexpected, the MAC layer 306 may modify the packet to provide an indication that the data in the packet was unexpected prior to being put onto the network. In some embodiments, the MAC layer 306 may replace the FCS value with a value which indicates that the packet contains unexpected or corrupted data. This value may be in the FCS field or elsewhere in the packet. In some embodiments, a tag may be added to the packet which marks the packet as bad.

When it is determined that the data is unexpected, the MAC layer 306 may arrange it such that the FCS does not match packet contents (poison).

When it is determined that the data is unexpected, the MAC layer 306 may cause the packet along with the pre-computed FCS (and not recompute it again on transmit) to be put onto the network via the PHY layer 330. Any error in the packet in the transmit path will result in a receiving MAC layer in a destination NIC dropping the packet due to a packet/FCS mismatch.

By putting the transmit packet onto the network with the indication that the packet was corrupted or the like prior to being put on the network, the receiving endpoint will know that the transmit packet was corrupted prior to being put onto the network. If the packet were simply not transmitted, the receiving endpoint will assume that the transmit packet was loss due to network conditions. This would be undesirable as it may result in network management changes which are not required. This may result in a drop in transmit performance.

In general, if a packet is dropped by the transmit MAC layer 306, the protocol logic on the sending (transmit) side detects an acknowledgement timeout (that is no acknowledgement is received within a given time period) and retransmits the packet. From the protocol perspective, whether the packet is dropped in the MAC layer or in the network the results are the same—that is a retransmit. However, in some embodiments, a drop in the transmit MAC layer 306 can be detected early (that is there is no need to wait to the end of the acknowledgment time out period) and the retransmit can be started early as there is deterministic information that the packet was not put onto the network.

In some embodiments, the retransmit may be started early whenever it is determined from the FCS that the data in the packet is unexpected, regardless of the behaviour of the MAC layer 306.

The MAC layer 306 may also perform any necessary network access layer processing on the packets to be transmitted. This may include one or more of frame delimiting and recognition, discarding malformed frames, and/or padding the data packet, timestamp insertion.

The MAC layer 306 may provide a transmit packet time stamp 316 to the transport layer (e.g. the TOE and/or the transport layer of the protocol stack). The timestamp enables the endpoints to keep a current measurement of the roundtrip time (RTT) of the network between them. This value helps, for example, each transport stack to set and adjust its retransmission timer.

The MAC layer 306 may output the packets to the PHY layer 330. The PHY layer 330 may transmit the data over the physical medium of the network, which may, for example, be an optical fibre or copper cable or any other suitable medium. The PHY layer 330 may be an Ethernet PHY configured to implement the Ethernet physical layer portion of the associated standards. In other embodiments, any other suitable physical layer protocol may be used.

The FCS technique can be used to detect errors while the data is being transmitted through the data path of the NIC as long as a (validly computed) FCS accompanies the data through that data path of the NIC.

In some embodiments one or more further checks (in addition to the one performed in the MAC) of the FCS can be performed at different points along the transmit path. The one or more different points may be upstream of the MAC. The data may be in the same memory or may be located in different memory or buffer locations.

Figure 4:
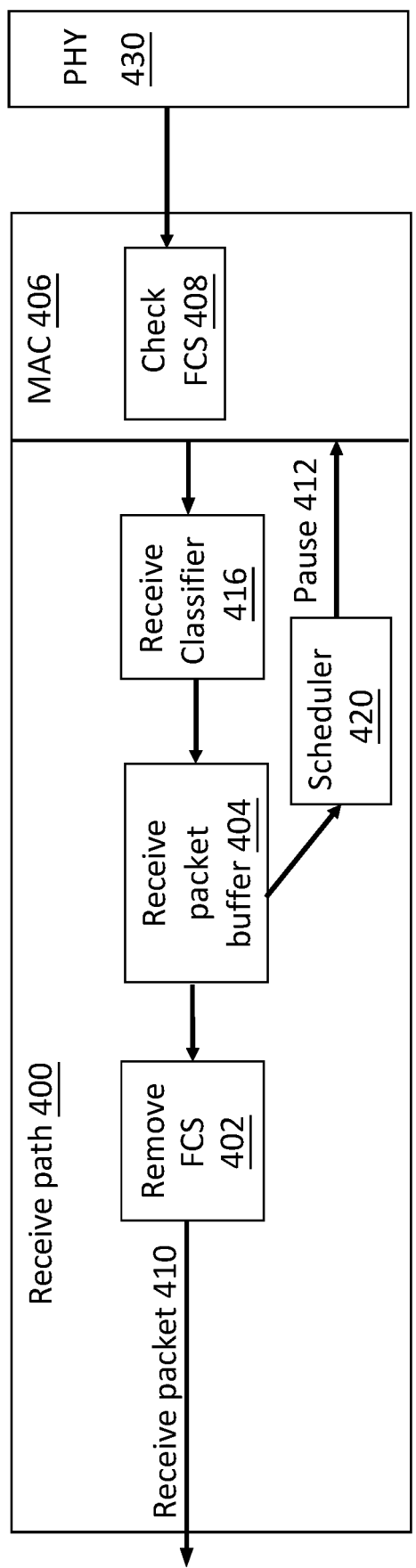
FIG. 4 shows a receive path of a network interface device of some embodiments.

Reference is made to FIG. 4 which schematically shows a receive path 400 MAC (medium access control) layer 406 and PHY (physical) layer 430 provided on the NIC. This is for receiving data from the network.

The receive path is one or more of: logic, one or more FIFOs and/or other memory: and/or one or more CPUs. The components of the receive path may be chained together and act to move the data from the MAC layer 406. Various of the components of the receive path may be provided by suitable circuitry. The MAC layer 406 and the PHY layer 430 may be provided by suitable circuitry.

It should be appreciated that the transmit path and the receive path may be provided by separate components. Alternatively, the transmit path and receive path may be implemented by one or more shared components.

Packets from the network are received by the PHY layer 430 or physical layer. The PHY layer 430 may be an Ethernet PHY configured to implement the Ethernet physical layer portion of the associated standards or in accord with any other physical layer protocol.

The PHY layer 430 provides the received packets to the MAC layer 406.

The MAC layer 406 is provided with an FCS checking function 408 to check the FCS in each packet. In particular, the FCS checking function 408 will determine the FCS from the values in the packet. The FCS checking function 408 will determine if the determined FCS value is the same as the FCS value in the packet. The FCS checking function may be provided by suitable circuitry.

If the FCS values are not same, the MAC layer 406 makes a determination that the data has been corrupted and will drop the packet.

The MAC layer 406 may check if the packet has an indication that the packet was corrupted prior to be put into the network. That is, the packet was corrupted or bad before the packet was put onto the network by the NIC of the transmitting node. For example, the MAC layer 406 may check the value of the FCS or look for a tag.

The MAC layer 406 may keep a count of the number of packets that have failed the FCS check as part of its measured statistics. The MAC layer 406 may keep a track of the number of packets which were corrupted prior to being put onto the network, Lost or dropped packets may be measured by the transmit path of every NIC.

Where the FCS values are not same and there is no indication that the packet was corrupted prior to transmission, it can be assumed that the packet was corrupted when it crossed the network.

The MAC layer 406 may signal a corrupt FCS to the sender by protecting the basic header information with a separate in-packet integrity mechanism (e.g. using checksum or CRC (cyclic redundancy check) independent of the corrupt FCS (which indicates the contents of the packet are not reliable).

Where the FCS values are not same, the transport layer protocol (e.g. RDMA or TCP) will assume that the packet has not been received and no acknowledgement is sent for that packet, resulting in the retransmission of that packet.

If the FCS values are the same, then no action in this regard is required by the MAC layer 406.

The MAC layer 406 may perform any MAC level protocol processing and provides the packet, with the FCS value, to a packet classifier 416. The packet classifier 416 may, for example, perform header parsing and matching functions. The functions provided by the packet classifier 416 will depend on the functions required by the system. For example the packet classification may be used to spread traffic flows for load balancing and/or for supporting a relatively high data rate, and/or separate different traffic types for different processing.

The packet classifier 416 will direct the received packets with the FCS value to the receive packet buffer or other suitable memory.

An FCS removal function 402 is configured to determine an FCS for received packet which has been stored in the receive packet buffer packet. In particular, the FCS removal function 402 will determine the FCS from the values in the packet (excluding the added FCS). The FCS removal function 402 will determine if the determined FCS value is the same as the FCS value in the packet. The FCS removal function may be provided by suitable circuitry.

If the values are the same, the FCS is removed from the packet and the receive packets 410 are directed for processing by the NIC and/or the host.

In some embodiments, the FCS is not removed from the packet as this may be used by downstream processing.

If the FCS values are not same, the FCS removal function 402 makes a determination that the data is unexpected. In other words, there has been a change in the data after the data has been received from the network. The data may be considered invalid or incorrect. The data may be unexpected as a result of memory corruption and/or corruption in the logic in NIC. The packet may be discarded or dropped.

The upper level protocol TCP/RDMA may be notified and the connection may be terminated or closed or reset.

A scheduler 420 is configured to control the output of packets from the MAC layer 406 to the receive packet buffer 404.

The scheduler 420 can, for example, send a pause request 412 to the MAC layer 406 to pause the output of data from the MAC layer 406. This pause request may, for example, be sent if the scheduler needs to slow down the rate at which packets are provided to the receive packet buffer. The pause request may cause a pause of a defined length of time. The defined length of time may be predefined and/or may be provided in the pause request itself. Alternatively, the pause request may start a pause and the pause is ended by a start request received from the scheduler.

The FCS technique can be used to detect errors while the data is being moved through the receive data path of the NIC as long as a (validly computed) FCS accompanies the data through that data path of the NIC.

In some embodiments two or more further checks (in addition to the one performed in the MAC) of the FCS can be performed at different points along the receive path. The data may be in the same memory or may be located in different memory or buffer locations.

Figure 5:
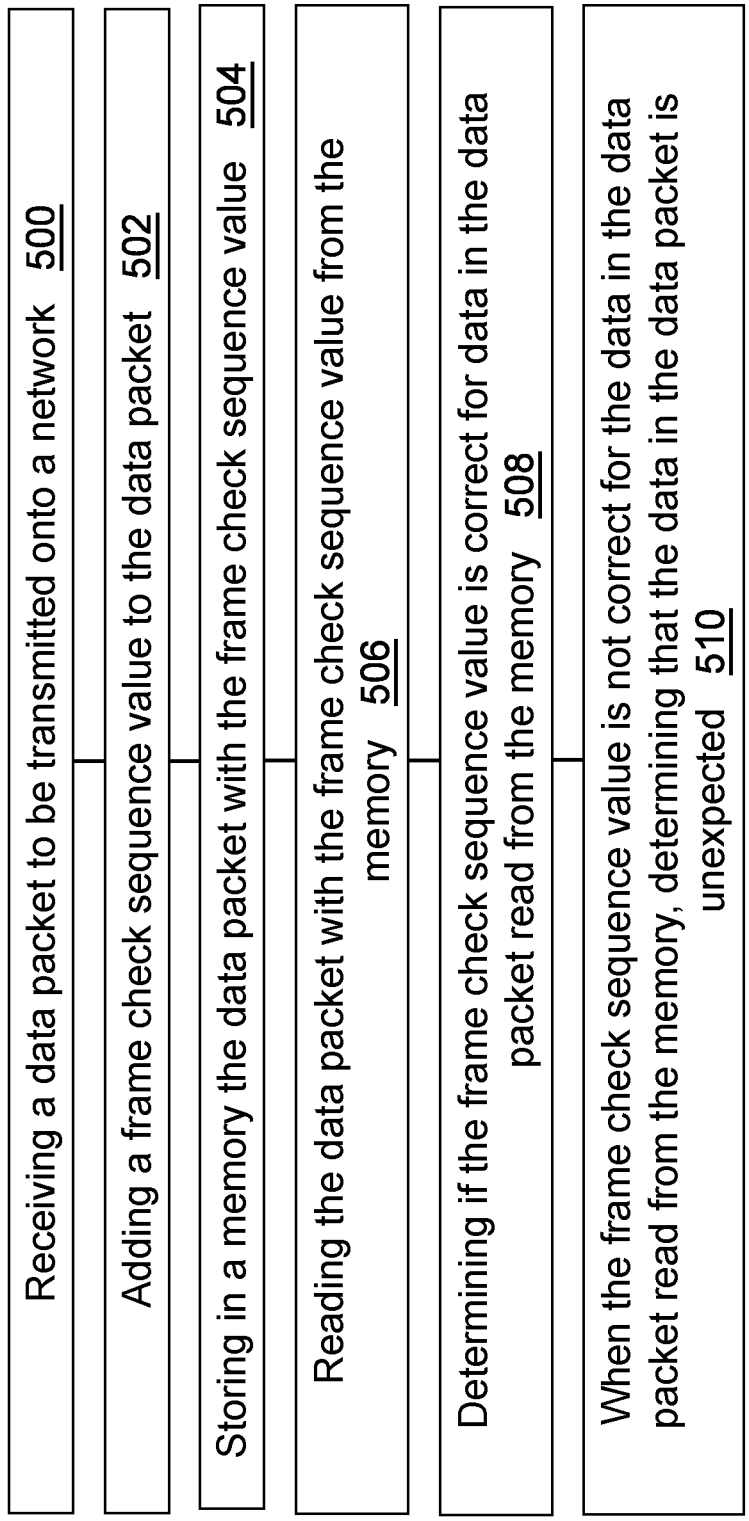
FIG. 5 shows a first method of some embodiments.

Reference is made to FIG. 5 which shows a first method of some embodiments. The method may be performed by a NIC. In some embodiments, the method may be implemented by computer software executable by a data processor, such as in a processor, or by hardware, or by a combination of software and hardware.

The method may comprise, as referenced 500, receiving a data packet to be transmitted onto a network.

The method may comprise, as referenced 502, adding a frame check sequence value to the data packet.

The method may comprise, as referenced 504, storing in a memory the data packet with the frame check sequence value.

The method may comprise, as referenced 506, reading the data packet with the frame check sequence value from the memory.

The method may comprise, as referenced 508, determining if the frame check sequence value is correct for data in the data packet read from the memory.

The method may comprise, as referenced 510, when the frame check sequence value is not correct for the data in the data packet read from the memory, determining that the data in the data packet is unexpected. The data may be unexpected as a result of memory corruption and/or corruption in the logic in NIC.

Figure 6:
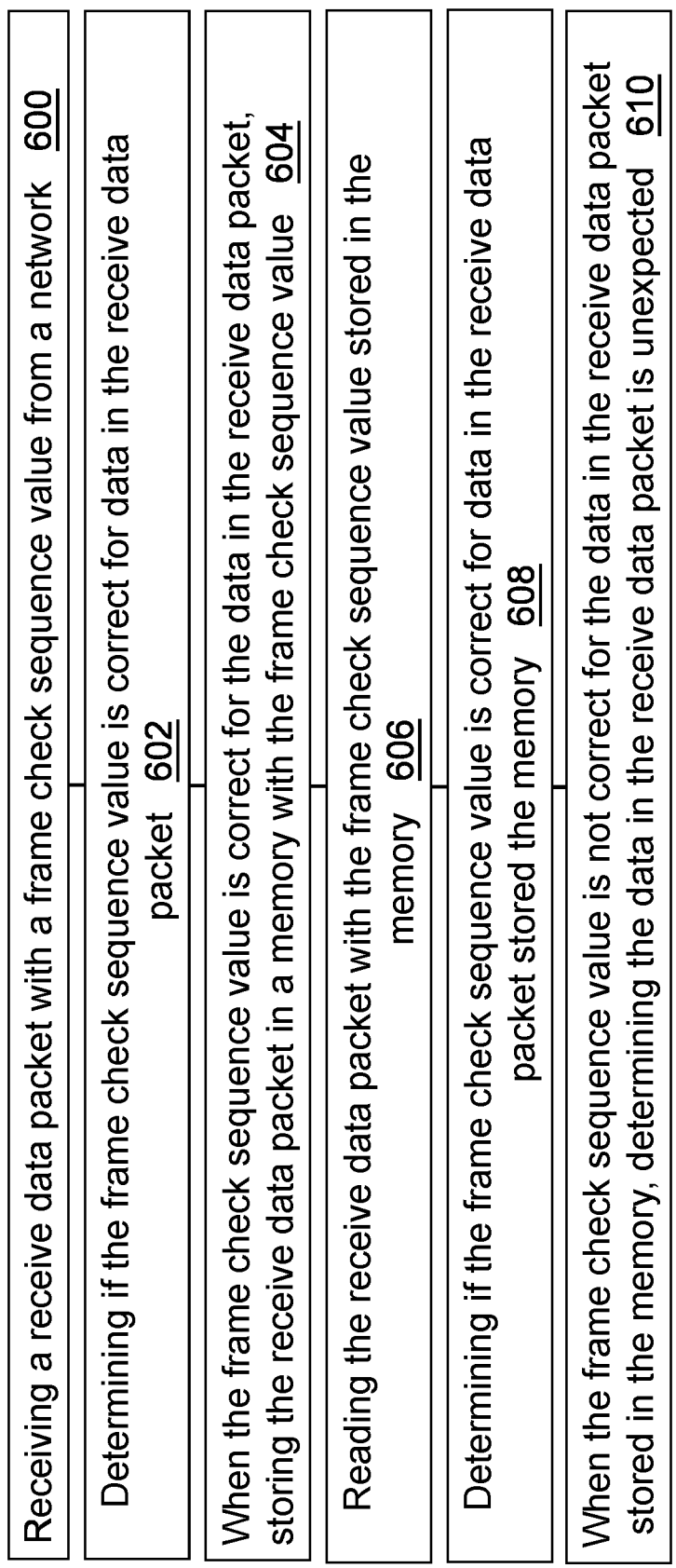
FIG. 6 shows a second method of some embodiments.

Reference is made to FIG. 6 which shows a first method of some embodiments. The method may be performed by a NIC. In some embodiments, the method may be implemented by computer software executable by a data processor, such as in a processor, or by hardware, or by a combination of software and hardware.

The method may comprise, as referenced 600, receiving a receive data packet with a frame check sequence value from a network;

The method may comprise, as referenced 602, determining if the frame check sequence value is correct for data in the receive data packet.

The method may comprise, as referenced 604, when the frame check sequence value is correct for the data in the receive data packet, storing the receive data packet in a memory with the frame check sequence value. This determines that there has been no corruption or modification of the data transmitted across the network.

The method may comprise, as referenced 606, reading the receive data packet with the frame check sequence value stored in the memory.

The method may comprise, as referenced 608, determining if the frame check sequence value is correct for data in the receive data packet stored the memory.

The method may comprise, as referenced 610, when the frame check sequence value is not correct for the data in the receive data packet stored in the memory, determining the data in the receive data packet is unexpected. The data may be unexpected as a result of memory corruption and/or corruption in the logic in NIC.

Computer software or program, also called program product, including software routines, applets and/or macros, may be stored in any apparatus-readable data storage medium and they comprise program instructions to perform particular tasks.

A computer program product may comprise one or more computer-executable components which, when the program is run, are configured to carry out embodiments. The one or more computer-executable components may be at least one software code or portions of it.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

The invention claimed is:

1. A network interface device comprising:
   first circuitry configured to:
      receive a data packet to be transmitted onto a network; and
      add a frame check sequence (FCS) value to the data packet;
   a transmit packet buffer configured to store the data packet with the FCS value, wherein the first circuitry is further configured to schedule transmission of the data packet with the FCS value from the transmit packet buffer; and
   media access control layer circuitry configured to:
      read, in accordance with the scheduled transmission, the data packet with the FCS value from the transmit packet buffer;
      determine whether the FCS value is not correct for data in the data packet; and
      modify, when the FCS value is not correct for data in the data packet, the data packet to include a value that itself indicates, to a receiving network device, that the data in the data packet changed before transmission onto the network by the network interface device.

2. The network interface device as claimed in claim 1, wherein providing the value comprises modifying one or more bits of the FCS value.

3. The network interface device as claimed in claim 1, wherein the value comprises a predefined value.

4. The network interface device as claimed in claim 3, wherein providing the value comprises replacing the FCS value with the predefined value.

5. The network interface device as claimed in claim 1, further comprising physical layer circuitry, wherein the media access control layer circuitry is further configured to:
   cause the data packet, with the value that itself indicates that the data in the data packet is unexpected, to be provided to the physical layer circuitry for transmitting onto the network.

6. The network interface device as claimed in claim 1, wherein the network interface device is coupled to a first node executing an application, wherein the media access control layer circuitry is further configured to:
   signal the application to begin a retransmit procedure for the data packet when the data in the data packet is unexpected.

7. The network interface device as claimed in claim 1, wherein the network interface device is configured to operate in accordance with a transmission control protocol or a remote direct memory access protocol.

8. The network interface device of claim 1, wherein the value is provided in a field of the data packet other than a FCS field.

9. The network interface device of claim 1, wherein the value is provided as a tag added to the data packet.

10. The network interface device of claim 1, wherein the value configures a receiving network device to determine, independent of the FCS value, that the data in the data packet is unexpected.

11. The network interface device of claim 1, wherein the first circuitry is further configured to:
   transmit, prior to receiving the data packet to be transmitted onto the network, a transmit packet credit to a source of the data packet to indicate that the first circuitry is able to receive the data packet.

12. A method comprising:
   receiving a data packet to be transmitted onto a network;
   adding a frame check sequence (FCS) value to the data packet;
   storing in a transmit packet buffer the data packet with the FCS value;
   scheduling transmission of the data packet with the FCS value from the memory;
   reading, in accordance with the scheduled transmissions, the data packet with the FCS value from the transmit packet buffer;
   determining whether the FCS value is not correct for data in the data packet; and
   modifying, when the FCS value is not correct for data in the data packet, the data packet to include a value that itself indicates, to a receiving network device, that the data in the data packet changed before transmission onto the network.

13. The method as claimed in claim 12, further comprising:
   causing the data packet with the FCS value to be transmitted onto the network.

14. The method as claimed in claim 12, further comprising:
   signaling an application to begin a retransmit procedure for the data packet when the data in the data packet is unexpected.

* * * * *